Patented Feb. 11, 1941

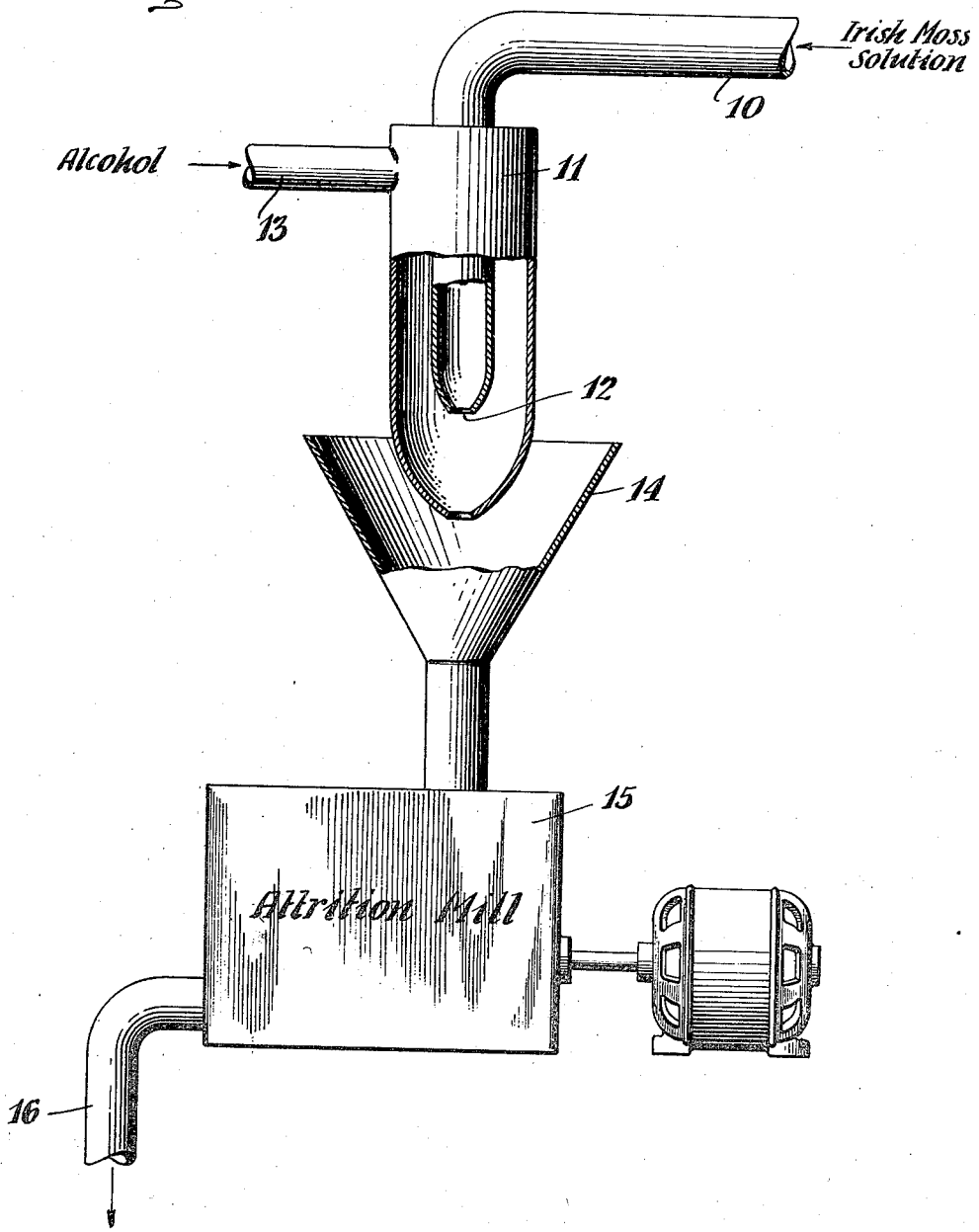

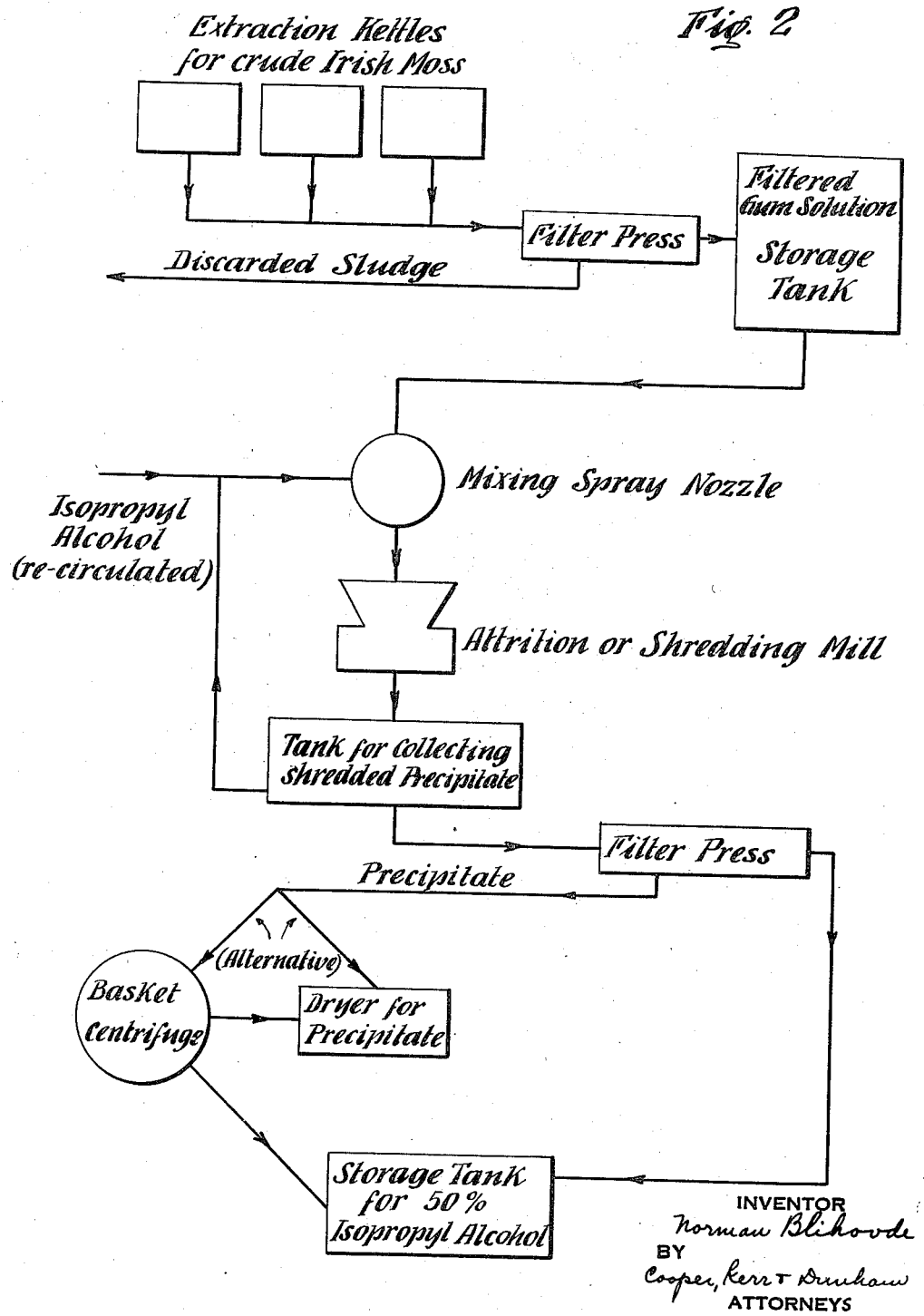

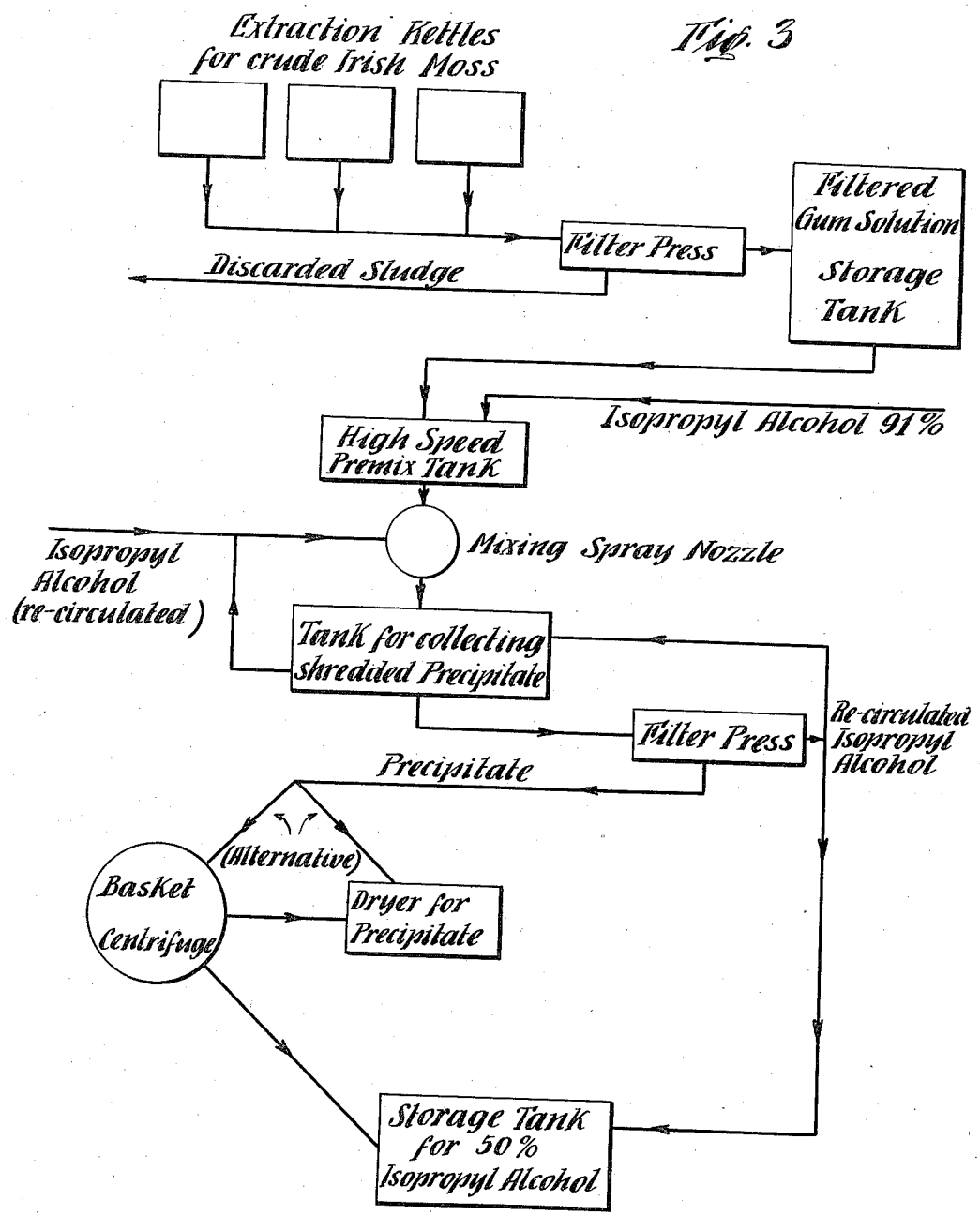

2,231,284

UNITED STATES PATENT OFFICE 2,231,284

PURIFICATION OF IRISH MOSS

Norman Blihovde, Clifton, N. J., assignor to Jacques Wolf & Company, Passaic, N. J., a corporation of New Jersey Application July 29, 1937, Serial No. 156,300

12 Claims. (Cl. 260—209)

This invention relates to the manufacture of refined gum, more particularly to the manufacture of refined and purified vegetable gums or like colloids, and in one important specific aspect, to the manufacture of a highly refined and purified colloidal product of Irish moss (*Chondrus crispus*).

Heretofore a common procedure for manufacturing refined gums has been to extract the crude vegetable product (such as Irish moss or other marine or land vegetation) with water, usually at boiling, and thereafter to filter out the crude fiber fraction, so as to yield a solution of the corresponding colloid. This procedure, however, does not remove from the latter the odors, flavors, soluble salts, organic acids, starches (when they have been rendered soluble, as by a boiling or other cooking extraction), reducing sugars, colors, and other soluble impurities, which are usually and naturally present in the original crude vegetable product. The filtrate or solution of the colloid is finally dried by heat, and except in some cases where spray drying is used (requiring much heat), the heat-dried product must usually be ground to increase its solubility or to make it marketable.

It has been found not only that the foregoing process fails to remove many impurities and tends to impair the rehydration factor (conveniently called "solubility") of the colloid, but that particularly during drying, the viscosity of the colloid itself is reduced, apparently at least in part by chemical changes effected by the impurities in the solution, and the high degree of heat generally used appears to catalyze the destruction of viscosity, by hydrolysis. The heat, moreover, usually darkens the product, and is apt to result in burning, charring or carmelization. On the other hand, if low temperatures are used for drying, biological fermentations in the solution are decidedly favored during the long drying period then required, and these likewise decrease the viscosity of the colloid itself to a very great extent; the use of preservatives to control fermentation renders the product unfit for food purposes, for which these colloids, if purified, are especially adapted.

It is accordingly an important object of the present invention: to provide improved procedure which obviates or minimizes one or more of the difficulties and disadvantages, including those hereinabove summarized, that are characteristic of previous methods for refining vegetable gums; at the same time, to provide a rapid, economical and relatively simple method of producing refined gum, as from Irish moss, and to produce thereby a colloid of greatly improved impurity, solubility, and viscosity.

Other methods than the ordinary procedure hereinabove described have been proposed for the treatment of Irish moss, with the view of effecting its purification, including removal of its odor and flavor, but it is an object of the present invention to provide an improved purification of vegetable gums of that character, and at the same time to obtain a high viscosity product with a minimum of steps and in a rapid and economical manner. It has now been found, for instance, that the substantial protein content of crude Irish moss appears to have a very decided effect in reducing the viscosity of the final refined gum, and a further object of the invention is therefore to provide for the production of a refined colloid, as from Irish moss, wherein the undesirable protein content is greatly reduced, and its objectionable effect obviated. Moreover, it has been found not only that various types of gum vary in composition from each other, but that gums of the same type or class (e. g., Irish moss) vary considerably in their composition in the crude state, particularly when they come from different geographical locations. Accordingly, another object of the present invention is to produce refined gums which have a practically uniform, high purity irrespective of wide variation in their original compostion, and which likewise have ready solubility and high viscosity, whether produced from the better or the poorer grades of crude material.

Further objects of the invention are to provide procedure whereby a desirably comminuted, even powdered, refined gum may be directly obtained without first drying the colloid and then grinding it, and wherein the product may be rapidly dehydrated to a dry comminuted state with little or no heat. Thus the invention not only avoids the decrease in viscosity that normally attends the grinding operation in the ordinary procedure described above, but may also eliminate the grinding operation itself.

Other objects and advantages include those hereinafter stated or apparent in connection with the following description of important and particularly useful examples of the invention, involving the production of purified colloids from Irish moss.

In the drawings:

Fig. 1 shows a simplified or diagrammatic illustration of certain apparatus with which the procedure may be carried out;

Fig. 2 shows a diagrammatic flow-sheet of one embodiment of the invention; and

Fig. 3 shows a diagrammatic flow-sheet of another embodiment.

A water solution of the gum is first established, for example, by extracting the raw Irish moss with water and then filtering out the crude fiber fraction, as in the usual manner hereinabove described. These steps are indicated in Figs. 2 and 3 by the extraction kettles, filter press, and storage tank receiving the solution from which the fiber sludge has been removed. Although the extraction is preferably performed with hot water or with actual cooking, good results are obtained with a cold treatment in certain cases, and it will be understood by those skilled in the art that the character of the extraction for best colloid recovery at this stage may be varied in accordance with the kind of moss treated. The colloid or gum content which the filtered solution should have for best results, may vary considerably; for example, with a solution containing, say, 2% or 3% of colloid or gum, and upon following the procedure hereinafter set forth, a very satisfactory product has been obtained. On the other hand, the solution may be concentrated very considerably, say, to a 10% colloid or gum content, with the advantage of alcohol economy in the subsequent procedure, and usually with improved results in other respects, particularly as to dehydration of the precipitate hereinafter described.

Referring now to Fig. 1 and to the process illustrated in Fig. 2, the Irish moss gum solution is introduced through a pipe 10, which leads to a mixing nozzle 11, the gum solution being discharged from the interior orifice 12 of the nozzle. At the same time, alcohol conveniently heated to about 85° C. is also introduced to the nozzle 11 through the pipe 13, the alcohol thus passing through the exterior portion of the nozzle. There the gum solution and the alcohol are rapidly and preliminarily mixed, and from the nozzle discharged into a funnel 14, and through the funnel to a grinding apparatus 15, which is of the type generally called an attrition mill; or if desired, in many cases, another type of grinding and mixing apparatus may be used—for example, a disk mill. As stated, the alcohol is preferably hot when introduced, although in a number of instances satisfactory results are had with the alcohol cold, i. e., at room temperature.

The action of the alcohol in and upon the gum solution is to precipitate or coagulate the gum or colloid itself from the latter solution, and the attrition or other grinding mill serves not only to mix the liquids thoroughly and intimately, but also to grind up or shred or pulverize the precipitate of gum or colloid, as fast as it is formed, and preferably (in accordance with our present understanding of the process) while the precipitating action is actually going on.

The resultant effluent from the mill 15, through the discharge pipe 16, consists of the precipitated or coagulated colloid in a finely divided condition, carried by a vehicle which consists chiefly of alcohol and water, but which contains in solution the flavors, odors, soluble salts, organic acids, starches (if solubilized before the preliminary filtration), reducing sugars, coloring matter and like impurities, including the protein material, present in the original gum solution.

Although in many cases other alcohols may be used (for instance, ethyl, methyl, n-propyl or like alcohols), we have found that the procedure just described (and also the hereinafter-described procedure of Fig. 3) is particularly effective with isopropyl alcohol, of 91% strength. Generally, it is preferable that the alcohol be of low boiling point and be free or as free as is commercially practicable, from non-volatile ingredients or from ingredients other than water which have a higher boiling point than alcohol; this purity of the alcohol being especially desirable where the resulting colloid is to be used for food purposes. Although the proportions may be varied to a considerable extent without much variation in the results obtained, I have found that notably good results are had, with the procedure of Fig. 2, where alcohol is added to the gum solution in such proportion that the resulting effluent or alcohol and water mixture (going to mill 15, Fig. 1) contains about 50% of alcohol by weight. For example, where a 2% gum solution is used, there should be introduced approximately 50 parts by volume of 91% iso-propyl alcohol for each 40 parts by volume of gum solution.

The precipitated gum resulting from the foregoing treatment is not only in a divided form but consists of discrete particles which give it the appearance of a fibrous mass, so that the effluent from the mill 15 generally resembles a water suspension of paper pulp. The grinding or shredding step, wherein the suspended precipitate is forcibly and positively comminuted as soon as it is formed or in effect, I believe, while it is being formed, is of particular advantage not only in affording an effective precipitation of the colloid free of impurities, but in facilitating subsequent mechanical separation of alcohol and water to remove the impurities.

The effluent from the mill 15 may be collected in a suitable tank, where a considerable quantity of the alcohol and water vehicle is drained from the mass of coagulated particles of colloidal material, and whence the alcohol mixture may be efficiently recirculated (together with some fresh alcohol, if desired) to act on the continuing flow of crude gum solution entering the nozzle 11 (see also Fig. 2). From the collecting tank, the precipitate is taken to a filter press, where nearly all of the remaining alcohol and water is usually removed. If desired, a wash of alcohol say, 91% iso-propyl alcohol) may thereafter be run through the filter press, and likewise squeezed out.

Ordinarily, the precipitate may then be carried to a drier, where it is distributed on screens and dried before a blast of warm air (for instance, air heated to 50°–60° C.); it is usually thoroughly dried in about 2 to 6 hours.

In some cases the precipitated or coagulated gum, after removal from the filter press, may advantageously be introduced into a basket centrifuge. The latter is operated for, say, 10 to 15 minutes, and the precipitate which is thus further dehydrated can then be transferred to the drier as described above. As stated, the heat used for drying should be very low; indeed, in some instances, as where the operation of the filter press is very effective, or where centrifuging is also used and is particularly thorough, the product may be dried rapidly without any heating at all.

An important advantage of the invention is that its procedure may be carried on as a continuous process. For example, the original Irish moss solution and the alcohol may be continuously fed to the mixing nozzle 11, through suitable measuring or metering devices so as to maintain the desired proportions, and the resulting mixture is then continuously operated upon by the mill 15. The consequently continuous stream of precipitate-bearing effluent may then be led to a filter-press until it is filled with precipitate, and then to an empty filter press while the precipitate from the first is gradually fed to a centrifugal separating device adapted to operate continuously (such devices being known and available), for further liquid-removal. The product may thereafter be passed slowly through (or repeatedly through) a blast of warmed air, to carry out the ultimate drying step. If desired, the preliminary extraction and filtering of the gum solution may also be performed continuously—so that the whole process is a continuous one.

Another and presently-preferred embodiment of the invention is illustrated in Fig. 3. The crude Irish moss is extracted and filtered as for the previously-described procedure, and the freshly-filtered gum solution is transferred to a pre-mix tank, and there subjected to violent agitation while alcohol is mixed in quickly until the resulting mixture contains about 50% alcohol—that is, for example if 91% iso-propyl alcohol is used, until the actual or true alcohol content of the mixture is 50%. The precipitate-forming mixture so made is adapted to form a very finely divided precipitate; the general appearance of the mixture at this stage is best described as milky, and on close inspection it appears to be composed of small granules of undehydrated colloid suspended in the aqueous alcohol vehicle.

The mixture is then forced through a mixing spray nozzle, such as generally illustrated at 11 in Fig. 1, and there intimately mixed with alcohol, say, 91% iso-propyl alcohol. For this step, the size of the tube 10 or other aperture leading to the nozzle is preferably small, and likewise the size of the orifice 12 from which the mixture is ejected at relatively high speed into the alcohol—best results having been obtained when the orifice 12 is less than three-sixteenths of an inch in diameter. The result of this alcohol treatment is that the small granules of undehydrated colloid are almost immediately dehydrated, and are thrown down, in the effluent from the nozzle, as a very fine powdery precipitate. According to my present understanding, the extreme fineness of this precipitate is caused by: first, the pre-mixing step which forms the small granules by violent agitation and quick addition of alcohol (creating, in effect, an emulsion); second, the step of forcing this emulsion through a small opening; and third, the strong shearing force exerted upon it by the strong alcohol. More specifically, the action of the alcohol in the mixing nozzle is believed to be two-fold, in that: (1) it breaks up the emulsion, so as to disperse the granules, and (2) it immediately dehydrates the colloid, so that each granule is reduced to an actual precipitation of its dry matter content.

For either or both of the premixing and nozzle-mixing steps, the alcohol may be either cold, (i. e., at room temperature or less) or may be heated to 50° C. or more (up to the boiling point). Satisfactory results have been obtained using cold alcohol in each step, but it has been found that the dehydration of the colloid is more rapid and complete, and that the resulting fine precipitate can be more efficiently filtered, if the undehydrated granular pre-mixture is heated to somewhat over 50° C. under a reflux condenser prior to mixing with cold alcohol, i. e., prior to the nozzle-mixing step.

In effecting the pre-mixture of gum solution and alcohol for the procedure now being described, it appears to be important that the alcohol be added to the gum solution rather than vice versa. That is, if the gum solution is added to the alcohol, the colloid is thrown down as an actual fibrous precipitate, rather than emulsified, and cannot be pumped through the small orifice for the further alcohol treatment. Indeed, it has been found that a mixture of alcohol and gum solution which contains 50% alcohol apparently never produces a fully dehydrated coagulation or precipitation of the colloid, no matter how the mixture is made. In the procedure of Fig. 3, however, the dehydration is completed by the further alcohol treatment which forcibly breaks up the emulsion or incipient precipitate (producing at once a fine powdery precipitate), and I accordingly now prefer this procedure to that of Fig. 2, wherein a grinding step, as by an attrition mill, is employed to accomplish the desired effect.

Following the alcohol treatments (in the process of Fig. 3), the precipitate-bearing liquid, collected in a suitable tank, may conveniently be passed through a filter-press and the precipitate there efficiently separated from the alcohol-water vehicle. A wash of alcohol (say, 91% iso-propyl alcohol) may thereafter be circulated through the filter press, to remove the last traces of water and soluble impurities, and the precipitate can be removed and dried. Where the precipitate-bearing mixture coming to the filter-press is hot (as where the pre-mixture has been kept above 50° C.), it may advantageously be cooled before reaching the filter-press, so as to minimize loss in alcohol when the press is later opened to remove the precipitate (which would otherwise be hot). To effect such cooling, for example, the mixture en route to the filter press can be circulated through an internal tubular cooler which is refrigerated with circulating calcium chloride brine at 0° C. or below.

The alcohol-containing liquid drained from the precipitate as the latter is collected before passing on to the filter-press, may be effectively recirculated through the mixing nozzle, i. e., to carry on the precipitate-completing and dehydrating step. Of course, a continual dilution of this alcohol will result, but I have found that the dilution is in no way objectionable, nor deleterious to the dehydration of the granular content of the pre-mix, as long as the actual or true alcohol content of the applied liquid does not drop below 55%.

It will now be appreciated that this procedure (of Fig. 3) lends itself even more satisfactorily to economical continuous operation than does the process of Fig. 2. That is, the finely divided precipitate can be continuously removed by filtration, and the nozzle-mixing step can be continued with recirculated alcohol until the strength of the latter drops to 55%. By that time, in the ordinary course, the frames of the filter press are compactly filled with the precipitate. An empty filter press can then be brought into operation, and the alcohol in the recirculating system replenished to bring it above 55% alcohol, or replaced with fresh 91% iso-propyl alcohol (or corresponding strength of such other alcohol as may be used).

Although a basket centrifuge is shown in Fig. 3 for possible further treatment of the precipitate, there is ordinarily no need for it at all. Indeed, the exceedingly fine precipitate resulting from the procedure just described, is usually so thoroughly dehydrated as it comes from the filter-press, that only the mildest heat, and often none at all, is needed to complete its drying in a very short time.

It has been found that if the gum solution, as originally extracted from the crude Irish moss and filtered, is allowed to stand for any considerable length of time, there is a loss of viscosity not only in the gum solution but in the eventual dried precipitate. However, if the pre-mixing step of the process of Fig. 3 is carried out immediately with the freshly filtered gum solution, the resulting alcohol-containing emulsion may be kept for long periods without any drop in viscosity—so that the crude material may be extracted and so treated in large batches, and held for further treatment when and if desired. It appears that the pre-mixing treatment has a very definite preserving action against biological fermentation, and in inhibiting hydrolysis as caused by heat and by soluble impurities contained in the liquid.

The refined and dried gum resulting from the procedure of the invention (as exemplified in Fig. 2 or Fig. 3) is usually—particularly when the procedure of Fig. 3 is used—in a sufficiently finely divided form for all commercial purposes, but if not, the dried colloid is extremely brittle and may be pulverized very easily and without injuring its viscosity or other characteristics. The product thus obtained from the treatment of Irish moss, in accordance with the present invention, has been found to have a remarkable freedom from the marine type odor and flavor characteristic of the ordinary or commercial Irish moss, and also from colors and other soluble impurities, including alcohol-soluble impurities; at the same time the product is characterized by a high solubility (specifically known as "rehydration factor") and an extremely high viscosity. Upon treating Irish moss in accordance with the procedure of either Fig. 2 or Fig. 3, for example, refined gums or colloids have been produced, of which one per cent solutions have a viscosity of several hundred centipoises, and in some cases as high as 1000 centipoises or more, depending upon the character of the crude material treated. Like one per cent solutions of Irish moss gums refined according to the ordinary cooking, filtering and drying process have a viscosity of no more than 1.5 to 5 centipoises; and it will therefore be understood that an Irish moss gum of which a one per cent solution has a viscosity of 200 centipoises, or even 50 centipoises, represents a distinct and valuable improvement over the dried products of the ordinary process just mentioned.

The viscosities mentioned above and elsewhere herein are stated in accordance with the scale or measurement of a standard MacMichael viscosimeter, standardized against C. P. 95% glycerine, distilled water, and commercial #1 castor oil. Although one per cent gum solutions have been referred to, like improvement is had with other strengths of solution. For example, whereas two per cent solutions of two different commercial Irish moss powders (crude) were found to have viscosities of 59.5 and 33.8 centipoises respectively, solutions of the dry products resulting from treatment of the same materials by the process of Fig. 2 had viscosities of 963.0 and 409.0 centipoises respectively; and it was found that an even greater increase in viscosity was obtained when the crude Irish moss was first washed with water, before treating it. It will be understood, of course, that wherever mention is made herein, or in the appended claims, of the "viscosity" or "viscosity factor" of a gum or colloid, there is meant the viscosity of an aqueous solution (i. e., rehydration) of such gum or colloid.

It may be noted that whereas attempts have been hitherto made to remove certain impurities from commercial Irish moss powder or unground or coarsely milled Irish moss by subjecting the material to the action of a mixture of water and an alcohol miscible therein (i. e., the crude dry material is added to the mixture of water and alcohol), the present procedure is not only entirely different but accomplishes a variety of new results. Thus in accordance with examples described hereinabove, a pre-established gum solution is not only treated with alcohol to precipitate the colloid but the latter is comminuted positively and so to speak, mechanically, at least as soon as the precipitating action is completed. The effect of this procedure (including the grinding or shredding of the precipitate in Fig. 2 or the like shearing action thereon by the alcohol in the mixing nozzle of Fig. 3) is: to effect a thorough removal of soluble impurities, far more complete than with the prior method just mentioned; to afford the satisfactory achievement of each of the objects of the invention hereinabove stated; and to produce a precipitated colloid that can be dried very easily, with little or no heat and even with little or no mechanical force to express the impurity-removing liquid.

It should also be noted that with procedure such as is exemplified in Figs. 2 and 3, and particularly the latter, a very considerable economy of alcohol is effected, both by recirculation, and by recovery (e. g., through distillation) from the final filtrate.

To illustrate the uniformity and thoroughness whereby a purified colloid may be obtained with the present invention, the following table summarizes the composition of a number of Irish moss gums refined by the procedure of Fig. 2 (like or better results having been had with the method of Fig. 3):

|  | Percentage range in crude Irish Moss | | Percentage range in colloid refined therefrom by my process | |
|---|---|---|---|---|
|  | From— | To— | From— | To— |
|  | Percent | Percent | Percent | Percent |
| Moisture | 6.5 | 15.2 | 0.5 | 1.0 |
| Protein (N×6.25) | 4.8 | 12.8 | 1.5 | 2.7 |
| Crude fibre | 2.0 | 2.9 | None | None |
| Gum (alcohol insoluble) | 85.2 | 63.3 | 98.0 | 96.3 |
| Water soluble ash | 0.96 | 3.71 | None | Trace |
| Water insoluble acid soluble ash | 0.48 | 1.86 | None | None |
| Water and acid insoluble ash | 0.06 | 0.23 | None | None |
| Totals | 100 | 100 | 100 | 100 |

It may be noted that the content of water- and acid-insoluble ash (i. e., sand, etc) may be as high as 5.0% or higher in the crude product as received in commerce whereas the batches used in the foregoing analytical work had been pre-cleaned. It may also be noted that my procedure affords a very satisfactory removal of alcohol-soluble proteins (determined above in the standard manner as 6.25 times the nitrogen content), with an apparently very beneficial effect on the viscosity of the product, as explained hereinabove.

It has been found that the procedure of the invention—for example, either of the methods specifically described above—may be employed to distinct advantage in the treatment of equivalent materials, with the correspondingly facilitated production of refined and comminuted gums having high purity, solubility, and viscosity factor.

Claims for refined gum products of the general character herein described are being asserted in the copending application of Arnold Pfister, Serial No. 156,299, filed July 29, 1937, for Manufacture of refined gum.

It will be understood that the invention is not limited to the specific procedures, features and uses herein described or shown, and set forth by way of illustration, but the described steps and procedures, although designed to be used in the combinations and relations stated, may be modified, curtailed, or used in other combinations or relations, and the invention carried out in other ways, with other apparatus or to other ends, without departure from its spirit as defined by the following claims.

I claim:

1. In a process of refining and purifying Irish moss gum, establishing a solution containing about 10% of said gum, treating said solution with alcohol and subjecting the precipitating gum, while under precipitating action of alcohol, to positive comminuting force, to produce a precipitate in comminuted form for facilitating mechanical separation of the liquid therefrom, and thereafter mechanically separating liquid therefrom, to obtain a residue which may be readily dried to produce a purified comminuted colloid of high viscosity.

2. The procedure of claim 1, wherein the alcohol-treating and gum-comminuting stage comprises violently agitating the gum solution while mixing alcohol into it until the actual alcohol content of the mixture is about 50%, and thereafter forcing the resulting mixture through an orifice of less than about three-sixteenths inch in diameter, into intimate mixture with additional alcohol of more than about 55% strength.

3. Procedure for refining and purifying Irish moss gum, including establishing a solution of said gum, and precipitating the gum from said solution as segregative precipitate free of soluble impurities and readily susceptible of mechanical separation from the impurity-containing liquid to produce a readily dried colloid of high viscosity, by mixing said gum solution with alcohol and subjecting the precipitate-forming mixture to positive grinding operation to produce a comminuted precipitate.

4. Procedure for refining and purifying Irish moss gum, including establishing a solution of said gum, and precipitating the gum therefrom substantially free of impurities, by treating said solution with alcohol to establish a precipitate-forming emulsion of the gum, and bringing additional alcohol into intimate contact with successive small portions of said emulsion to throw down therein a substantially dehydrated, finely comminuted precipitate of the gum.

5. In a process of refining Irish moss gum, establishing an aqueous solution of said gum, bringing alcohol and gum solution into contact with each other to precipitate the gum, said precipitate being produced in a segregative form wherein it may be dried without impairment of its viscosity, by subjecting the precipitating gum, while under precipitating action of alcohol, to positive comminuting force; and thereafter separating liquid from the precipitate to produce a dry comminuted colloid of high purity, viscosity and solubility, said liquid separation including subjecting the precipitate to mechanical separating action for removal of a substantial quantity of the liquid therefrom.

6. In procedure for removing soluble impurities from Irish moss gum and for obtaining therefrom a purified colloid of high viscosity, the steps of establishing an aqueous solution of Irish moss gum, and precipitating the gum from said solution as a segregative precipitate free of soluble impurities and readily susceptible of mechanical separation from the impurity-containing liquid for rapid drying of said precipitate without impairment of its viscosity, by treating the gum solution with alcohol to form a granular suspension of the gum and thereafter intimately treating said suspension with further alcohol by vigorous admixture for breaking up said gum suspension and rapidly dehydrating the particles thereof.

7. In procedure for removing soluble impurities from Irish moss gum and for obtaining therefrom a purified colloid of high viscosity, the steps of establishing an aqueous solution of Irish moss gum, precipitating the gum from said solution as a segregative precipitate free of soluble impurities and readily susceptible of mechanical separation from the impurity-containing liquid for rapid drying of said precipitate without impairment of its viscosity, by mixing successive portions of said gum solution and of alcohol together and immediately passing the mixed portions of gum solution and alcohol through a grinding apparatus for production of a substantially dehydrated precipitate in divided form, said alcohol and gum being mixed in the proportion of at least about 50 parts by volume of strong alcohol, to 40 parts by volume of gum solution; and thereafter drying the precipitate to produce a dried, purified, flavorless and odorless Irish moss gum of high viscosity, by subjecting the precipitate to mechanical separating action for removal of a substantial quantity of the liquid therefrom and completing drying of the precipitate at a temperature substantially less than 100° C.

8. The procedure of claim 6, wherein the alcohol-treating steps to produce a gum precipitate comprise forming the gum suspension by mixing alcohol into the gum solution while agitating the latter, and thereafter breaking up the gum suspension into a finely divided, substantially dehydrated precipitate by forcing a thin stream of said suspension into intimate contact with a flow of alcohol of more than about 55% strength.

9. In procedure for removing soluble impurities from Irish moss gum and for obtaining therefrom a purified colloid of high viscosity, the steps of establishing an aqueous solution of Irish moss gum, and precipitating the gum from said solution as a purified segregative precipitate readily susceptible of mechanical separation of liquid therefrom, by mixing said gum solution with alcohol and subjecting the resulting precipitate-forming mixture to positive grinding operation to produce a substantially dehydrated precipitate, the alcohol being added to the gum solution in such proportion that the resulting mixture subjected to the grinding operation contains an actual alcohol content of not less than about 50 per cent.

10. In procedure for removing soluble impurities from Irish moss gum and for obtaining therefrom a purified colloid of high viscosity, the steps of establishing an aqueous solution of Irish moss gum, and precipitating the gum from said solution as a purified segregative precipitate readily susceptible of mechanical separation of liquid therefrom, by treating the gum solution with alcohol to form a granular suspension of the gum and thereafter intimately treating said suspension with further alcohol by vigorous admixture for breaking up said gum suspension and rapidly dehydrating the particles thereof, the actual alcohol content of the further liquid added to the mixture in the last-mentioned step being not less than about 55 per cent.

11. The procedure of claim 10, wherein the granular suspension of the gum produced by alcohol treatment is heated to a temperature of at least about 50° C. for the aforesaid subsequent intimate treatment thereof with further alcohol.

12. In procedure for removing soluble impurities from Irish moss gum and for obtaining therefrom a purified colloid of high viscosity, the steps of establishing an aqueous solution of Irish moss gum, and precipitating the gum from said solution as a purified segregative precipitate readily susceptible of mechanical separation of liquid therefrom, by treating said solution with alcohol to establish an emulsion of the gum containing about 50 per cent. alcohol and thereafter breaking up the said gum emulsion into a finely divided, substantially dehydrated precipitate by forcing a thin stream of said emulsion into intimate contact with a flow of alcohol of more than about 55 per cent. strength.

NORMAN BLIHOVDE.